(12) United States Patent
Camet et al.

(10) Patent No.: US 8,794,773 B2
(45) Date of Patent: Aug. 5, 2014

(54) DEFORMABLE MIRROR HAVING FORCE ACTUATORS AND DISTRIBUTED STIFFNESS

(75) Inventors: Sébastien Camet, Meylan (FR);
Jean-François Curis, Domene (FR);
Frédéric Rooms, Biviers (FR)

(73) Assignee: ALPAO, Gieres (FR)

( * ) Notice: Subject to any disclaimer, the term of this patent is extended or adjusted under 35 U.S.C. 154(b) by 627 days.

(21) Appl. No.: 13/058,737

(22) PCT Filed: Aug. 12, 2009

(86) PCT No.: PCT/FR2009/001000
§ 371 (c)(1),
(2), (4) Date: May 10, 2011

(87) PCT Pub. No.: WO2010/018326
PCT Pub. Date: Feb. 18, 2010

(65) Prior Publication Data
US 2011/0211268 A1    Sep. 1, 2011

(30) Foreign Application Priority Data

Aug. 14, 2008 (FR) .................... 08 555579

(51) Int. Cl.
*G02B 7/182* (2006.01)
*G02B 5/08* (2006.01)
(52) U.S. Cl.
USPC ......................................... 359/849; 359/846
(58) Field of Classification Search
USPC ................................................. 359/846, 849
See application file for complete search history.

(56) References Cited

U.S. PATENT DOCUMENTS

| 6,293,680 B1 * | 9/2001 | Bruns .......................... 359/849 |
| 7,518,780 B2 * | 4/2009 | Papavasiliou et al. ........ 359/290 |

(Continued)

FOREIGN PATENT DOCUMENTS

| FR | 2 876 460 A1 | 4/2006 |
| FR | 2 923 301 A1 | 5/2009 |

OTHER PUBLICATIONS

International Search Report mailed by the International Searching Authority (ISA/EP) on Dec. 10, 2009 in connection with PCT International Application No. PCT/FR2009/001000, filed Aug. 12, 2009.

(Continued)

*Primary Examiner* — Scott J Sugarman
(74) *Attorney, Agent, or Firm* — John P. White; Cooper & Dunham LLP (57) ABSTRACT

The present invention relates to a deformable mirror (1) comprising a deformable membrane (2) with a reflective outer face (3) and an opposite face (4), a rigid support plate (7), and at least one force actuator (5, 6). Each actuator (5, 6) comprises at least two elements (5, 6) suitable for interacting with each other remotely so as to generate a force in a direction that is substantially perpendicular to the surface of the initially non-deformed membrane (2), and suitable for being displaced relative to each other in the direction of said generated force so as to cause said membrane (2) to be deformed locally. One of the two elements (5, 6) is incorporated into the support plate (7) and the other element is coupled to the membrane (2). One of said two elements (5, 6) is suitable for controlling the intensity of said generated force. According to the invention, the mirror (1) further comprises reference means (7, 8) coupled to the membrane (2) via at least one rigid link means (10) and via at least one flexible link means (11). Each rigid link means (10) is secured to said membrane (2), and each flexible link means (11) is secured at least in part to the reference means (7, 8).

25 Claims, 6 Drawing Sheets

(56) References Cited

U.S. PATENT DOCUMENTS

2005/0030438 A1     2/2005   Nishioka
2007/0286035 A1    12/2007   Uchida

OTHER PUBLICATIONS

Written Opinion of the International Searching Authority mailed by the International Searching Authority (ISA/EP) on Dec. 10, 2009 in connection with PCT International Application No. PCT/FR2009/001000, filed Aug. 12, 2009.

International Preliminary Report on Patentability (Chapter I of the Patent Cooperation Treaty), including the Written Opinion of the International Searching Authority, issued by the International Bureau of WIPO on Apr. 12, 2011 in connection with PCT International Application No. PCT/FR2009/001000, filed Aug. 12, 2009.

Hamelinck, R., Rosielle, N., Kappelhof, P., Snijders, B., & Steinbuch, M. (2004). Large adaptive deformable membrane mirror with high actuator density. In D. B. Calia, B. L. Ellerbroek, & R. Ragazzoni (Eds.), *Advancements in Adaptive Optics*. Proceedings of the SPIE, vol. 5490 (pp. 1482-1492). SPIE, Bellingham, WA, 2004.

\* cited by examiner

DEFORMABLE MIRROR HAVING FORCE ACTUATORS AND DISTRIBUTED STIFFNESS

This application is a §371 national stage of PCT International Application No. PCT/FR2009/001000, filed Aug. 12, 2009, claiming priority of French Patent Application No. 0855579, filed Aug. 14, 2008, the contents of all of which are hereby incorporated by reference into this application.

The present invention relates to a deformable mirror having force actuators and distributed stiffness.

TECHNICAL FIELD

The present invention relates to the field of deformable mirrors each having a reflective membrane and force actuators.

It relates more particularly to a deformable mirror comprising a deformable membrane with a reflective outer face and an opposite face, a rigid support plate, and at least one force actuator. Each actuator comprises at least two elements suitable for interacting with each other remotely so as to generate a force in a direction that is substantially perpendicular to the surface of the initially non-deformed membrane, and suitable for being displaced relative to each other in the direction of said generated force so as to cause said membrane to be deformed locally. One of the two elements is incorporated into the support plate and the other element is coupled to said membrane. One of said two elements is suitable for controlling the intensity of said generated force.

STATE OF THE PRIOR ART

The term "force actuator" is used in the present patent to mean an actuator in which it is the force generated by the actuator that is controllable and not the displacement of an element of said actuator. For example, an actuator made up of an electromagnet and of a permanent magnet is referred to as a "force actuator" whenever it is control of the generated magnetic force that controls the amplitude of the displacement of the magnet for deforming the membrane: when there is no longer any force being applied, the magnet returns to its initial position and the membrane is no longer deformed. Conversely, it is referred to as a "displacement actuator" whenever it is the position of an element (e.g. an actuator based on variation of length of a piezoelectric element) suitable for being displaced that is controlled directly: when the force ceases to be applied, the actuator remains in the same position. These two types of actuator are not equivalent, in particular because the relationship between displacement and generated force is not necessary linear, although actuators are generally dimensioned so that this relationship is as linear as possible.

In addition, the terms "flexible link" and "rigid link" used in the present patent designate respectively first and second links having respective first and second stiffnesses, the second stiffness being greater than the first stiffness. Merely by way of indication, a flexible link typically has elongation at least equal to a threshold lying in the range 15 nanometers (nm) to 25 nm under the action of a force equal to the average force developed by an actuator, this displacement corresponding to the displacement that is observable in the state of the art of wave-front sensors, while a rigid link typically has elongation that is less than said threshold for the same force.

The general principle of such deformable mirrors is known from the state of the art. Deformable mirrors in which the reflective membrane is merely suspended over the edges generally have low stiffness. Stiffness must be compatible with the force that the force actuator is capable of generating in order to generate sufficient deformation. Since the membrane is suspended over the edges, such a mirror has a resonance frequency that is low when the diameter of the membrane increases, which makes it impossible to implement deformable mirrors that have both high frequency response and a large diameter. The general technical problem posed by such mirrors thus consists in how to increase or distribute their stiffness so as to increase their frequency response. Unfortunately, increasing the stiffness of the membrane remains limited by the capacity for deformation of the force actuators.

An example of a deformable mirror having non-distributed stiffness is described in Patent Document FR 2 876 460. In that document a deformable mirror has a deformable membrane that has a reflective outer face and an inner face to which a plurality of permanent magnets are fastened. A housing containing electromagnets is placed facing the permanent magnets so as to exert an electromagnetic force thereon, thereby locally displacing the corresponding zone of the deformable membrane. Associating a permanent magnet with an electromagnet corresponds to a force actuator of the electromagnetic type. In order to avoid imprint phenomena on the membrane, the inner face is covered with a uniform layer made of a flexible material.

A drawback of such a mirror lies firstly in the fact that even though the layer of flexible material does reduce imprint phenomena, it does not make it possible to distribute the stiffness of the membrane. Thus, local deformation of the membrane is not transcribed in sufficiently localized manner. Another drawback stems from the fact that the layer of flexible material is placed very close to the electromagnets. That layer and the reflective outer layer of the membrane are thus inevitably deformed by thermal expansion due to the heat given off by the electromagnets.

A first solution for distributing stiffness is proposed in Patent WO 2005/050283. In that document, a deformable mirror comprises a deformable membrane, an array of actuators situated facing the opposite face of the membrane, and an array of actuating connections. Each actuating connection is coupled to an actuating surface of a respective one of the actuators in the array and of a respective point of the second surface opposite from the actuating surface. Each actuating connection has anisotropic rigidity and transmits movement perpendicular to the second surface. The actuators are constituted by permanent magnets and by electromagnets. The deformable membrane is secured via rigid rods to a magnetizable membrane. While the electromagnet is operating, the permanent magnet, without being displaced, locally exerts a magnetic force on the magnetizable membrane, thereby locally deforming said magnetizable membrane. That local deformation is in turn transmitted to the reflective membrane via rigid rods. Mechanical elements make it possible to close the magnetic field generated by each actuator.

A drawback with such a mirror lies in the complexity of its construction, due to the numerous mechanical parts to be assembled together, implying tight mechanical tolerances. In addition, the permanent magnet does not act mechanically (by means of its own displacement) but rather it acts magnetically (without being displaced) to cause a magnetizable intermediate membrane to be deformed locally. That presupposes that a magnetizable membrane is available, which can be a constraint when an appropriate magnetizable material needs to be found. Finally, the electromagnets are disposed very close to the remainder of the structure, and that firstly can cause thermal expansion due to the heat given off by the electromagnets and secondly makes it impossible to do any repair work on an electromagnet without damaging the membranes.

A second solution for distributing stiffness is described in Patent Document FR 07/07719. In that document, a deformable mirror comprises a deformable membrane having a reflective face and an opposite face, a rigid plate and a structure of actuators fastened to the rigid plate and suitable for locally deforming the membrane. That mirror further comprises an adhesive layer on the opposite face of the membrane, and a structure of flexible coupling means. Each flexible coupling means comprises a mechanical connection means, a top link means coupling the top end of the mechanical connection means to the adhesive layer, and a bottom link means coupling the bottom end of the mechanical connection means to the rigid plate. The mechanical coupling means can, for example, be a rod. That configuration based on a flexible structure procures distribution of the stiffness of the membrane over the entire surface thereof, while also enabling all of the component elements of the mirror to be assembled together simply, and while reducing the mechanical tolerance requirements at the actuators.

Unfortunately, when electromagnetic-type force actuators are used, that solution suffers from the drawback of making it difficult to reduce the pitch between the force actuators, due to the large size of the rods and to the additional machining that is necessary. In addition, the housing in which all of the elements are enclosed is impossible to open with a view to doing repairs, e.g. for replacing a coil, without damaging the membrane. Finally, the electromagnets are disposed very close to the layers of flexible adhesive and to the link means constituted by adhesives. Those link means thus expand in uncontrollable manner under the effect of the heating caused by operation of the electromagnets.

Patent Application U.S. 2007/0286035 also describes a deformable mirror device as defined in the pre-characterizing portion of claim 1. Unfortunately, that device is not provided with means making it possible to achieve complex control of its surface.

Thus, no state-of-the-art solution makes it possible to procure a deformable mirror having force actuators that has its stiffness sufficiently distributed during local deformation, that is sufficiently simple and inexpensive to repair, and that offers the possibility of significantly reducing the distance between its actuators.

OBJECT OF THE INVENTION

An object of the present invention is to remedy that technical problem by using, in addition to the reflective deformable membrane and to the support plate, a two-stage structure in which the second stage has reference means. Each force actuator comprises a control element (e.g. an electromagnet) and an interaction element (e.g. a permanent magnet) for interacting with the control element. A first stage is made up of a combination of control or interaction elements, and of flexible and rigid link means connected in part to the deformable membrane. A second stage of control or interaction elements makes it possible to control relative displacement of the two elements and thus to cause the membrane to be deformed locally.

The approach to finding the solution consisted in looking for means of controlling the local deformations of the membrane (movement of the control or interaction elements is transformed in full into local deformation at the membrane) and of achieving them with sufficiently distributed stiffness. It then appeared that a two-stage structure, combining the force actuators with rigid and flexible link means could make it possible to generate mini secondary membranes at the deformation elements. These mini membranes could then be linked to the reflective membrane via rigid link means so as to transmit deformation in full to the reflective membrane while also distributing the stiffness of the mirror.

To this end, the invention provides a deformable mirror comprising a deformable membrane with a reflective outer face and an opposite face, a rigid support plate, and at least one force actuator. Each actuator comprises at least two elements suitable for interacting with each other remotely so as to generate a force in a direction that is substantially perpendicular to the surface of the initially non-deformed membrane, and suitable for being displaced relative to each other in the direction of said generated force so as to cause said membrane to be deformed locally. One of the two elements is incorporated into the support plate and the other element is coupled to said membrane. One of said two elements is suitable for controlling the intensity of said generated force. According to the invention, the mirror further comprises reference means coupled to said membrane via a plurality of links, each of which comprises at least one rigid link means and at least one flexible link means. Each rigid link means is connected to said membrane, each flexible link means is connected at least in part to the reference means, and said reference means are common to said plurality of links.

In the present patent, two elements are said to be "coupled" together when they are interconnected, not necessarily directly but optionally via other elements. Two elements are said to be "connected" together when the interconnection is direct and without any intermediate element.

The force actuator comprises a control first element suitable for controlling the intensity of the generated force, and an interaction second element suitable for interacting remotely with the control element to generate said force. The force results from the interaction of the two elements and does not exist without their mutual presence. One of the two elements is securely fastened to a rigid plate while the other is fastened to a flexible surface, so that the generated force causes only the element that is fastened to a flexible surface to be displaced. That element may be the control element or the interaction element depending on the various embodiments of the invention.

This feature makes it possible, for each deformation element, to constitute a mini secondary membrane constituted by limiting the flexible link means. Each mini membrane can then deform almost independently from the others, under the effect of the displacement of one element of the associated force actuator. This deformation is transmitted in full to the reflective membrane via the rigid link means.

Finally, such a feature makes it possible to place the various elements of a force actuator as far away as possible from the membrane. This makes it possible to prevent dust that is attracted by the control or interaction elements, in particular when electromagnets and permanent magnets are used, from coming to stick to the reflective membrane. Otherwise, such build-up of dust would reduce the optical quality of the mirror.

Advantageously, the element of the force actuator that is suitable for controlling the generated force is incorporated into the support plate. In which case, the control elements are spaced apart from the remainder of the mirror, thereby making it possible to prevent operation of them from causing thermal expansion of other component parts of the mirror.

Advantageously, at least one rigid link means is fastened via one end to the opposite face of the membrane and via another end to the reference means. This type of link makes it possible to have rigid link means outside the working zone defined by the actuators so as to reduce the size of the working zone to the bare minimum, that zone then being smaller than the suspended portion of the reflective membrane.

Advantageously, at least one rigid link means is fastened via one end to the opposite face of the membrane and via another end to a flexible link means. The stiffness is thus better distributed by associating rigid and flexible link means where there are not necessarily any actuators.

In a particular embodiment, the reference means are fastened to the support plate.

In another particular embodiment, the reference means comprise an intermediate support plate disposed between the membrane and the support plate. Since the mirror then has two support plates, it is possible to perform maintenance operations on one element of the mirror without risking damaging another element, in particular a fragile membrane. In particular, it is possible, for example, to replace a single actuator without damaging the membrane, which nevertheless requires a minimum amount of precaution to be taken.

Preferably, the intermediate support plate is provided with a set of openings, at least one force actuator being coupled to at least one of the openings. The interaction, e.g. electromagnetic interaction, is thus facilitated between the two elements of the force actuator, since the two elements of the actuator are thus not separated by the plate.

When the intermediate support plate is provided with at least one opening, a rigid link means is advantageously disposed at an opening and is fastened via one end to the opposite face of the membrane and via another end to the element of at least one force actuator that is coupled to the opening. The deformation element is thus remote relative to the membrane, the rigid link means transforming the displacement of the deformation element in full into local deformation of the membrane.

In which case, in a particular embodiment, at least one flexible link means is disposed at an opening and is fastened to the element of at least one force actuator that is coupled to the opening.

In another embodiment, at least one flexible link means is disposed at an opening and is fastened to at least one rigid link means. This makes it possible to distribute the stiffness better outside the zones in which there are no actuators, including between the actuators.

In another embodiment, the element of at least one force actuator that is coupled to an opening is fastened to the opposite face of the membrane. In this way, there are a plurality of actuators for which no rigid link means are used.

Advantageously, at least one flexible link means is disposed at an opening and is of size greater than the size of the opening. This makes it possible to have a contact area that is sufficiently large between the arrangement plate and the flexible link means.

Advantageously, at least one element of at least one force actuator that is coupled to an opening is of size smaller than the size of the opening. This makes it possible to improve the interaction between the two elements of a force actuator and optionally to dispose the element inside the opening.

In a particular embodiment, the element of at least one force actuator that is coupled to an opening and that is of size smaller than the size of the opening is disposed inside said opening.

In order to ensure that the interaction between the control and interaction elements is optimum, at least one element of at least one force actuator that is coupled to an opening and that is of size smaller than the size of the opening is disposed outside the opening.

Advantageously, the force actuators are disposed in a uniformly distributed matrix layout. The actuators can thus be disposed optimally so as to avoid discontinuities in the influence of each actuator on the deformation.

In a particular embodiment, the force actuator element suitable for controlling the intensity of the generated force is an electromagnet.

In a particular embodiment, the element of the force actuator that is suitable for remotely interacting with the element suitable for controlling the generated force is a permanent magnet.

In a particular embodiment of the flexible link means, the flexible link means comprise at least one flexible film covered with an adhesive material. This flexible film acts as a flexible link. The adhesive material may be disposed on the film only at the zones where fastening to another element is to be performed.

Advantageously, the flexible link means that are disposed on the same side of the reference means are constituted by a flexible film covering all of said flexible link means. This avoids having to make a plurality of small films, but it makes it possible to pool some of the flexible link means.

Advantageously, the rigid link means are constituted by rigid rods. This makes it possible to have link means that are simple, rigid and provided with two ends for associating the membrane with the intermediate support plate.

Advantageously, the rigid link means are fastened to the opposite face of the membrane via spots of an adhesive that is flexible in a direction perpendicular to the generated force and that is rigid in the direction of said generated force. Such a spot of adhesive makes it possible to impart a plurality of degrees of freedom to the interaction between the rigid link means and the membrane. Said membrane does not deform in the direction of the force but rather only in a perpendicular direction. The movement of the actuator is thus transmitted in full.

Advantageously, all of the rigid link means are fastened to the opposite face of the membrane via a layer of an adhesive that is flexible in a direction perpendicular to said generated force, and that is rigid in the direction of said generated force, covering the opposite face of the membrane, thereby simplifying bonding the rigid link means to the membrane with adhesive.

Advantageously, the rigid link means are fastened on the side opposite from the opposite face of the membrane via spots of rigid adhesive. This ensures that the displacement of the deformation element is transmitted in full for locally deforming the membrane.

Advantageously, for reasons of facilitating repair or maintenance, the support plate and the intermediate support plate are mechanically disunited. It is thus simpler to work on the control elements, or indeed on some other component part of the mirror, provided that certain precautions are taken.

In order to save space while also fastening the control elements even more securely to the support plate, the elements of the force actuators that are incorporated into the support plate are engaged in said support plate. It is thus possible to ensure that only the deformation elements are displaceable.

In order to avoid having non-uniform deformations depending on the zones considered on the mirror, the support plate is plane, and the intermediate support plate is plane.

In a particular embodiment, control of the elements of the force actuators that are suitable for controlling the intensity of the generated force is servo-controlled electrically.

BRIEF DESCRIPTION OF THE DRAWINGS

The invention can be well understood on reading the detailed description of non-limiting embodiments, accompanied by figures, in which.

DETAILED DESCRIPTION OF PARTICULAR EMBODIMENTS

Figure 1:
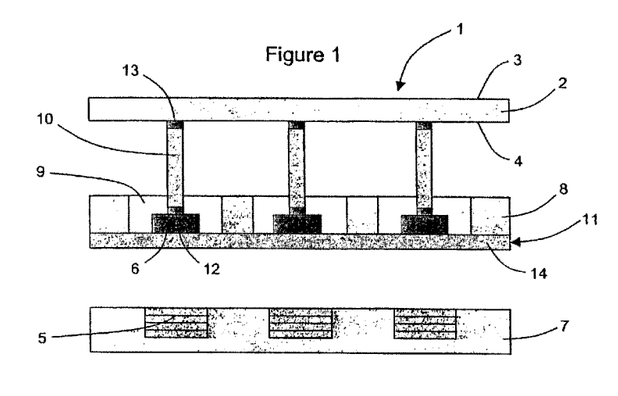
FIG. 1 is a diagram of a first embodiment of a deformable mirror having force actuators and distributed stiffness of the invention.

FIG. 1 is a diagram of a first embodiment of a deformable mirror having force actuators and distributed stiffness of the invention.

This deformable mirror 1 is made up of:
a deformable membrane 2;
force actuators, each of which comprises a control element 5 and a deformation element 6;
a support plate 7;
an intermediate support plate 8; and
links comprising
rigid link means 10; and
flexible link means 11.

The deformable membrane 2 is an optical substrate having a reflective face 3 and an opposite face 4. It is made of a material of the silicon type and has a thickness typically lying in the range 5 micrometers ($\mu$m) to 30 $\mu$m. In another embodiment, it is made of Kapton. Reflective surface treatment is deposited on the outer face 3 so as to perform the reflective function. This treatment is adapted to the desired use.

The control elements 5 and the deformation elements 6 form force actuators making it possible to cause the membrane of the mirror to deform locally. In this embodiment, the force actuators are of the electromagnetic type. The control elements 5 are thus electromagnets, e.g. coils made of copper, and the deformation elements 6 are permanent magnets, e.g. made of samarium-neodymium.

Each magnetic force actuator thus comprises a pair made up of an electromagnet 5 and of a permanent magnet 6. This pair is suitable for generating a force in a direction substantially perpendicular to the surface of the initially non-deformed membrane. The magnet is suitable for being displaced in the direction of the magnetic force. For this purpose, each electro-magnet 5 is disposed facing the permanent magnet 6 with which it is associated, along an axis perpendicular to the surface of the initially non-deformed membrane 2. In addition, each electromagnet 5 is securely fastened to the support plate 7 while each permanent magnet 6 is fastened only to a flexible link means. Only the permanent magnet 6 can thus be displaced under the effect of the magnetic force resulting from the interaction between the electro-magnet and the permanent magnet.

In another embodiment, it is the permanent magnet 6 that is securely fastened to the support plate 7 and it is the electromagnet 5 that is fastened to a flexible link means. Only the electromagnet 5 can then be displaced under the effect of the magnetic force.

The electromagnet 5 is controlled by modulating the current flowing through it. A Laplace force is then generated by interaction with the permanent magnet 6. This force repels or attracts the permanent magnet 6, thereby causing it to be displaced, and then causing the local deformation of the membrane 2.

Naturally, the person skilled in the art can adapt the present embodiment to force actuators of a non-magnetic type without going beyond the ambit of the invention.

The support plate 7 is a rigid and plane mechanical plate. For example, it may be made of aluminum or indeed of an aluminum-brass alloy.

The electromagnets 5 are engaged in holes provided in the support plate 7. The electromagnets are thus even further away from the remainder of the component elements of the mirror, thereby enabling them to suffer even less from the thermal expansion phenomenon caused by operation of the electromagnets. In another embodiment, the electromagnets 5 are not engaged in but rather are merely deposited on the support plate 7.

The intermediate support plate 8 is a rigid and plane mechanical plate. For example, it may be made of aluminum. It constitutes the reference means for the permanent magnets, so that said permanent magnets have a reference that is stationary relative to the electromagnets with which they are associated.

This intermediate support plate 8 is provided with a set of openings 9 in order to arrange the permanent magnets 6 on the support plate. Each magnet is disposed inside an opening. Each opening is disposed facing the electromagnet 5 with which the permanent magnet 6 disposed inside it is associated, along the axis perpendicular to the surface of the initially non-deformed membrane 2.

The openings 9 are of size larger than the size of the permanent magnets 6 in order to enable said permanent magnets to be inserted into the openings. They are also of shape identical to the shape of the permanent magnets that are advantageously of circular shape.

Figure 2:
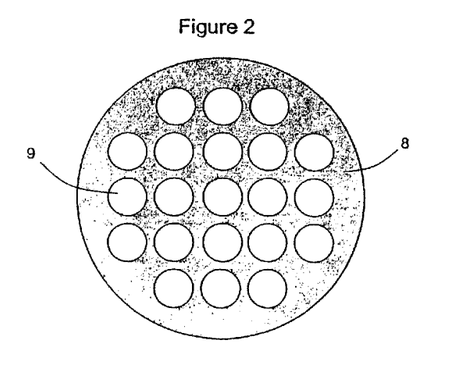
FIG. 2 is a plan view of an arrangement plate of the invention.

With reference to FIG. 2, which is a plan view of an example of an arrangement plate of the invention, the openings 9 are disposed in the plate 8 in a geometrical shape guaranteeing that the force actuators are confined, thereby making it possible to reduce the inter-actuator distance within the mirror.

The force actuators and the openings are advantageously disposed such that, in projection, they occupy the entire covering surface of the membrane 2, in a uniformly distributed matrix layout, as shown in FIG. 2. The influence of each of the actuators on the deformation of each of the corresponding zones of the membrane is thus identical. The inter-actuator distance is typically about 2.5 millimeters (mm). Other configurations of actuators and openings are also possible, in particular in a hexagonal or rectangular shape.

Each rigid link means 10 is associated with a force actuator so that the displacement of the permanent magnet is transmitted in full to the membrane 2 in the form of a local deformation. For this purpose, each rigid link means 10 is constituted by a rigid rod made, for example, of silica. This rigid rod is connected at its ends respectively, at one end, to the opposite face 4 of the membrane 2 and, at the other end, to the associated permanent magnet 6. It typically has a diameter lying in the range 50 $\mu$m to 300 $\mu$m, and a length lying in the range 50 $\mu$m to 5000 $\mu$m.

The person skilled in the art can observe that, since the size of the rigid rods 10 is much smaller than the diameter of the permanent magnets 6, the imprint phenomenon on the reflective face 3 is made all the smaller.

In order for the displacement of the magnet to be transformed in full into local deformation, each rigid link means 10 is fastened to the opposite face 4 of the membrane 2 by means of a spot of flexible adhesive 13 allowing enough degrees of freedom so that the membrane can be deformed locally. Similarly, each rigid link means 10 is fastened to the center of the associated permanent magnet 6 by a spot of rigid adhesive 12. Thus, each permanent magnet 6 is linked to the membrane 2 in rigid manner, thereby making it possible to maintain fixed the distance between the center of the magnet 6 and that zone of the opposite face 4 of the membrane 2 to which the rod 10 is bonded with adhesive, thus transforming the displacement of the magnet in full into local deformation of the membrane.

The adhesive used for the spots of rigid adhesive 12 is chosen from adhesives having low thermal expansion so as to be protected from the heat dissipation caused by the electromagnets 5. Their low thermal expansion prevents them from deforming under the Joule effect of the electromagnets and therefore avoids uncontrollable deformation of the membrane 2. An appropriate adhesive for the spots of rigid adhesive 12 may be chosen from the family of epoxy adhesives, known for their low thermal expansion.

The adhesive used for the spots of flexible adhesive 13 is made of silicone because it is slightly more flexible, thereby enabling the membrane to deform by turning a little, while also being sufficiently rigid in the direction perpendicular to the direction of the force generated by the actuator so that the displacement of the permanent magnet 6 is transmitted in full to the membrane 2. The flexible adhesive used is advantageously uniform so as to distribute the stiffness better, as mentioned in the seventh embodiment described below with reference to FIG. 8.

The permanent magnets 6 are disposed only in the openings 9 in the plate 8, which openings are of size greater than the size of the magnets. The flexible link means 11 thus interconnect the arrangement plate 8 and the permanent magnets 6. They are made of a material that is insensitive to magnetic field in order to prevent them from being deformed under the effect of the electromagnets 5. In the present embodiment, these means 11 are constituted by a flexible plastics film 14 entirely covering the arrangement plate 8. The material for making this film is chosen from the family of silicones or of polymers that have high elasticity. Adhesive is disposed on the edges and on the center of the film, in order to bond thereto the permanent magnet and the edges of the opening associated with the magnet.

In a particular embodiment, the film 14 is a heat-reflective film, thereby making it possible to send the heat given off by the electromagnets back towards them, and thus to procure a thermal mirror.

The top face of the film 14 is bonded with adhesive to the bottom face of the intermediate support plate 8. At the openings 9, the top face of the film 14 is bonded with adhesive to the bottom faces of the permanent magnets 6.

The additional rigidity procured by said film may be parameterized by its thickness and by the diameter of the opening 9, for other parameters remaining constant. The stroke decreases when the quantity of material increases, because the rigidity increases. In addition, when the diameter of the opening increases, the rigidity of the membrane decreases.

The flexible link means 11 constituted in this way can act as a secondary membrane relative to the reflective membrane 2. Under the effect of the movement of the permanent magnets, the film 14 deforms locally like a flexible membrane, and this deformation is transmitted to the reflective membrane 2 via the rigid rods 10.

More precisely, insofar as the film 14 is bonded by adhesive to the intermediate support plate 8 at the places where it is not bonded with adhesive to a permanent magnet 6, said film 14 is deformed at a permanent magnet independently from the remainder of the film deposited at other permanent magnets. Thus, at an opening 9, the film 14 acts as a mini secondary membrane defined by said opening. Each mini membrane can thus be deformed independently from the other mini membranes, under the effect of the displacement of the associated magnet.

All of the component elements of a unit for actuating the mirror, which unit is made up of a force actuator and of rigid link and flexible link means, also offer the advantage of being easily reproducible, thereby making it possible to facilitate mass production compared with prior art deformable mirrors that are more complex or that use mechanical parts that are more difficult to manipulate.

When making the deformable mirror 1 industrially, the support plate 7 for supporting the electromagnets 5 is mounted in a first mechanical assembly. The remaining components of the mirror, namely the membrane 2, the intermediate support plate 8 for supporting the permanent magnets 6, the rigid link means 10 and the flexible link means 11, are mounted in a second mechanical assembly. The two assemblies are formed independently from each other and are then secured together by means of screws. The support plate 7 for supporting the electromagnets 5 is thus easily detachable from the remainder of the mirror, for the purpose of working on said support plate, in particular on one of the electromagnets, without however damaging any of the other component parts of the mirror. In another embodiment, the two assemblies may be entirely and mechanically disunited.

FIGS. 3 to 11 are diagrams of various variant embodiments of the invention that are described below.

Figure 3:
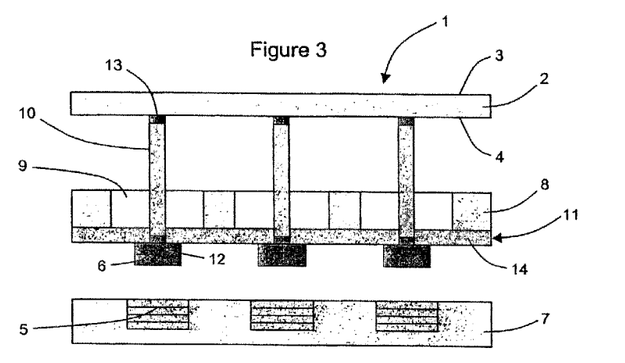
FIGS. 3 to 11 are diagrams respectively of second, third, fourth, fifth, sixth, seventh, eighth, ninth, and tenth embodiments of a deformable mirror having force actuators and distributed stiffness of the invention.

In the second embodiment of the invention shown in FIG. 3, the flexible film 14 is not bonded with adhesive to the bottom faces of the permanent magnets 6, but rather to their top faces. The rigid rods 10, and the spots of adhesive 12 transpierce the film 14. The permanent magnets 6 are thus no longer disposed inside the openings but rather outside said openings.

Figure 4:
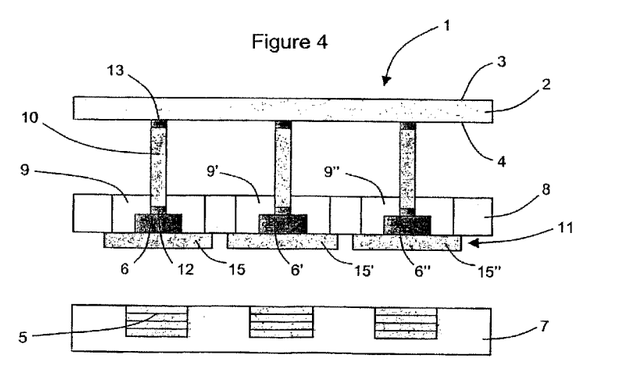

In the third embodiment of the invention that is shown in FIG. 4, the flexible link means 11 are constituted by a set of flexible films 15, 15', 15" of size greater than the size of the openings 9 of the intermediate support plate 8. Each flexible film is associated with an opening in the intermediate support plate at which a permanent magnet is disposed. Each flexible film 15, 15', 15" is connected firstly to the plate 8 and secondly to the permanent magnet 6, 6, 6" with which it is associated.

The material for making these mini films 15, 15', 15" may be identical to the material used for making the flexible film 14 of the above-described first embodiment, e.g. a silicone or a polymer.

These flexible films 15, 15', 15" act as secondary membranes relative to the reflective membrane 2. Insofar as they are physically independent, each film is deformed at the permanent magnet with which it is associated independently from the other films. Each film 15, 15', 15" thus acts even more as a mini secondary membrane defined by the associated opening 9, 9, 9" and is suitable for deforming independently from the others, under the effect of the associated permanent magnet.

Figure 5:
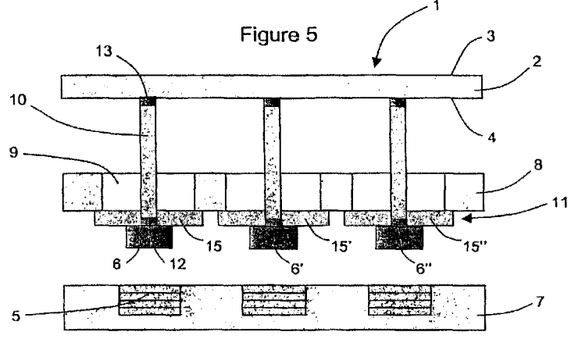

In the fourth embodiment of the invention shown in FIG. 5, the flexible link means 11 are constituted by a set of flexible films 15, 15', 15". Each film is bonded with adhesive to the top faces of the permanent magnets 6. The rigid rods 10, and the spots of adhesive 12 transpierce the film 14. In another embodiment, the rigid rods do not transpierce the film.

Figure 6:
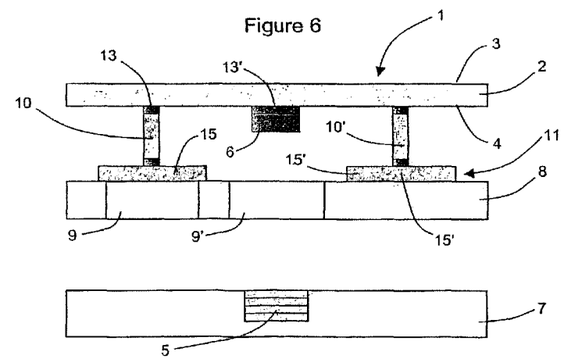

In the fifth embodiment of the invention shown in FIG. 6, one permanent magnet 6 is bonded directly to the reflective membrane 2 via a spot of flexible adhesive 13'. A rigid rod 10 is fastened to a flexible film 15 that is itself bonded with adhesive via its bottom face to the arrangement plate 8 at an opening. Another rigid rod 10' is fastened to a flexible film 15' that is itself bonded with adhesive via its bottom face to the arrangement plate 8 over a zone not provided with any opening.

Figure 7:
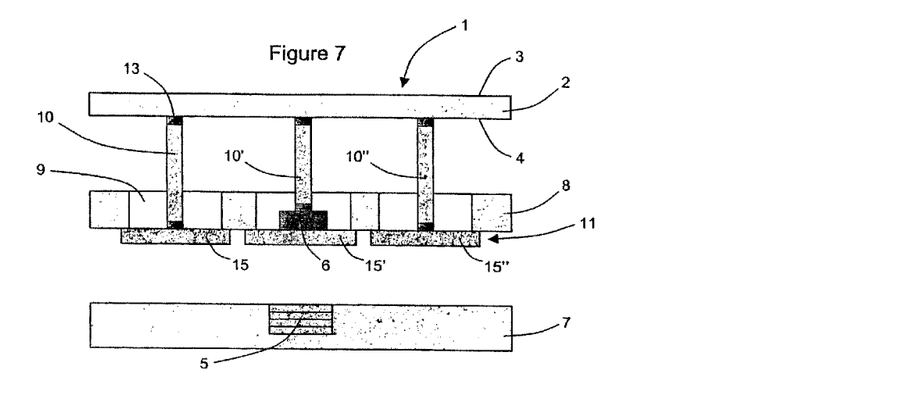

In the sixth embodiment shown in FIG. 7, a permanent magnet 6 is disposed between a rigid link means 10' and a flexible film 15' in a manner identical to the above-described first embodiment of the invention. A rigid rod 10 is fastened to a flexible film 15 that is itself bonded with adhesive via its top face to the arrangement plate 8 at an opening. Another rigid rod 10" is fastened to a flexible film 15" that is itself bonded with adhesive via its top face to the arrangement plate 8 at an opening.

Figure 8:
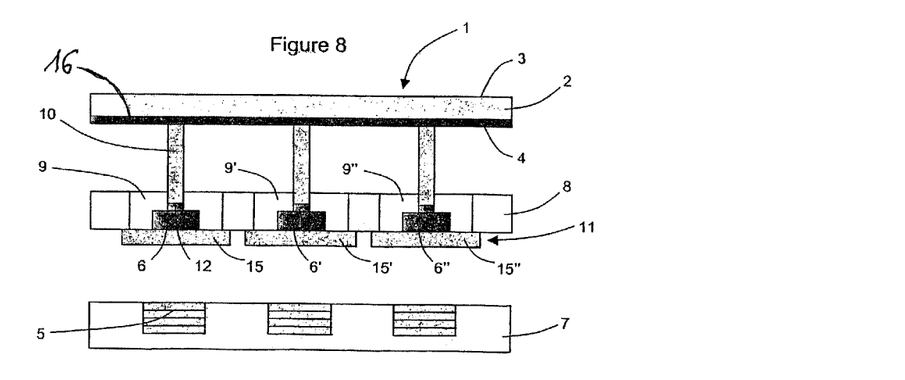

In the seventh embodiment of the invention shown in FIG. 8, the spots of flexible adhesive 13 have been replaced with a layer of flexible adhesive 16 covering the opposite face 4 of the membrane 2 over its entire length. The feature makes it simple to bond the elements to the membrane.

Figure 9:
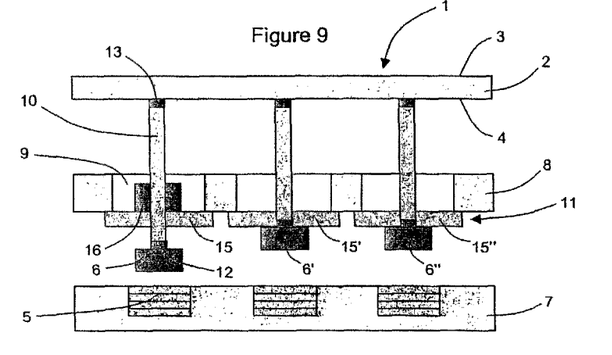

In the eighth embodiment shown in FIG. 9, the flexible film 15 is not bonded directly to the top face of the associated permanent magnet 6. The rigid rod 10 transpierces the film 14. In order to guarantee stability for the rigid rod 10 and thus for the permanent magnet 6, an additional spot of rigid adhesive 16 is disposed on the top face of the flexible film 15 and against the wall of the rigid rod 10 above the flexible film 15.

Figure 10:
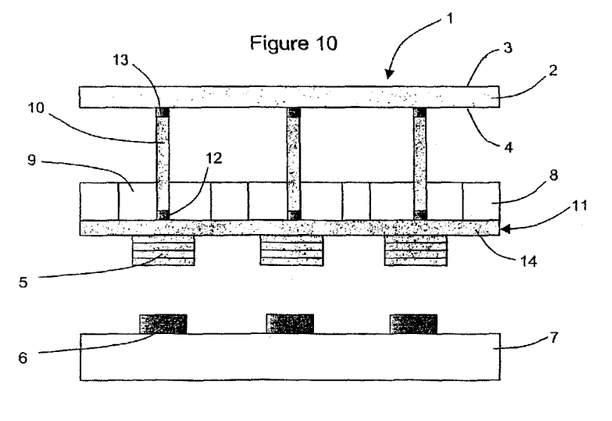

In the ninth embodiment of the invention that is shown in FIG. 10, the permanent magnets 6 and the electromagnets 5 are inverted. It is therefore still the electromagnets that control the intensity of the force generated but it is also the electromagnets that are suitable for being displaced under the effect of this magnetic force because they are connected only to flexible link means. The permanent magnets are fastened to the support plate 7. This embodiment is not, however, preferred, insofar as the embodiment with the electromagnets fastened to the support plate makes it possible to space them apart from the remainder of the structure, and to avoid thermal expansion phenomena due to operation of the electromagnets.

Figure 11:
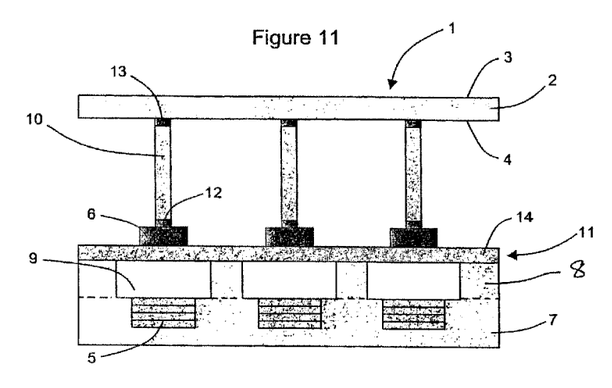

In the tenth embodiment of the invention that is shown in FIG. 11, the intermediate support plate 8 is fastened to the support plate 7 and may even be made in one piece with said support plate 7. The intermediate support plate 8 is provided with openings 9 in order to space the electromagnets apart from the remainder of the mirror so as to limit the consequences of the thermal expansion phenomenon.

The structure of a deformable mirror in the above-described embodiments of the present invention makes it possible to increase the passband of the mirror and thus to build deformable mirrors having a very large number of actuators. This structure makes it easier to choose the optimum material for the secondary membrane—or for the flexible link means. The diameter of said membrane may be adapted to determine the additional rigidity. Since the rigidity varies as a function of the diameter of the membrane, it is thus made all the simpler to increase the rigidity of the deformable mirror.

The above-described embodiments of the present invention are given by way of example and are in no way limiting. Naturally, the person skilled in the art can implement various variants of the invention without going beyond the ambit of the invention.

Finally, the invention may also be implemented to give an initial shape to a mirror, e.g. with rigid rods of various lengths. The initial shape given to the mirror may be modified subsequently or fixed once and for all.

The invention claimed is:

1. A deformable mirror (1) comprising a deformable membrane (2) with a reflective outer face (3) and an opposite face (4), a rigid support plate (7), and at least one force actuator (5, 6), each actuator (5, 6) comprising at least two elements (5, 6) suitable for interacting with each other remotely so as to generate a force in a direction that is substantially perpendicular to the surface of the initially non-deformed membrane (2), and suitable for being displaced relative to each other in the direction of said generated force so as to cause said membrane (2) to be deformed locally, one of the two elements (5, 6) being incorporated into the support plate (7) and the other element being coupled to said membrane (2), one of said two elements (5, 6) being suitable for controlling the intensity of said generated force, said deformable mirror (1) being characterized in that it further comprises reference means (8) coupled to said membrane (2) via a plurality of links, each of which comprises at least one rigid link means (10) and at least one flexible link means (11), each rigid link means (10) being connected to said membrane (2), each flexible link means (11) being connected at least in part to the reference means (8), and said reference means (8) being common to said plurality of links (10, 11), wherein the reference means (8) comprises an intermediate support plate (8) disposed between the membrane (2) and the support plate (7).

2. A deformable mirror (1) according to claim 1, wherein the element (5) of the force actuator (5, 6) that is suitable for controlling the generated force is incorporated into the support plate (7).

3. A deformable mirror (1) according to claim 1, wherein at least one rigid link means (10) is fastened via one end to the opposite face (4) of the membrane (2) and via another end to the reference means (8).

4. A deformable mirror (1) according to claim 1, wherein at least one rigid link means (10) is fastened via one end to the opposite face (4) of the membrane (2) and via another end to a flexible link means (11).

5. A deformable mirror (1) according to claim 1, wherein the reference means (8) are fastened to the support plate (7).

6. A deformable mirror (1) according to claim 1, wherein the intermediate support plate (8) is provided with a set of openings (9), at least one element of a force actuator (5, 6) being coupled to at least one of the openings (9).

7. A deformable mirror (1) according to claim 6, wherein at least one rigid link means (10) is disposed at an opening (9) and is fastened via one end to the opposite face (4) of the membrane (2) and via another end to the element of at least one force actuator (5, 6) that is coupled to the opening (9).

8. A deformable mirror (1) according to claim 6, wherein at least one flexible link means (11) is disposed at an opening (9) and is fastened to the element of at least one force actuator (5, 6) that is coupled to the opening (9).

9. A deformable according to claim 6, wherein at least one flexible link means (11) is disposed at an opening (9) and is fastened to at least one rigid link means (10).

10. A deformable according to claim 6, wherein the element of at least one force actuator (5, 6) that is coupled to an opening (9) is fastened to the opposite face (4) of the membrane (2).

11. A deformable mirror (1) according to claim 6, wherein at least one flexible link means (11) is disposed at an opening (9) and is of size greater than the size of the opening (9).

12. A deformable mirror (1) according to claim 6, wherein at least one element of at least one force actuator (5, 6) that is coupled to an opening (9) is of size smaller than the size of the opening (9).

13. A deformable mirror (1) according to claim 12, wherein the element of at least one force actuator (5, 6) that is coupled to an opening (9) and that is of size smaller than the size of the opening (9) is disposed inside said opening (9).

14. A deformable mirror (1) according to claim 12, wherein the element of at least one force actuator (5, 6) that is coupled to an opening (9) and that is of size smaller than the size of the opening (9) is disposed outside the opening (9).

15. A deformable mirror (1) according to claim 12, wherein the force actuators (5, 6) are disposed in a uniformly distributed matrix layout.

16. A deformable mirror according to claim 12, wherein the force actuator element 6) suitable for controlling the intensity of the generated force is an electromagnet.

17. A deformable according to claim 16, wherein the element of the force actuator (5, 6) that is suitable for remotely interacting with the element suitable for controlling the generated force is a permanent magnet.

18. A deformable according to claim 1, wherein the flexible link means (11) comprises at least one flexible film (14) covered with an adhesive material.

19. A deformable mirror (1) according to claim 1, wherein the flexible link means (11) that are disposed on the same side of the reference means (7, 8) are constituted by a flexible film (15) covering all of said flexible link means (11).

20. A deformable mirror (1) according to claim 1, wherein the rigid link means (10) are constituted by rigid rods.

21. A deformable mirror (1) according to claim 1, wherein the rigid link means (10) are fastened to the opposite face (4) of the membrane (2) via spots of an adhesive (13) that is flexible in a direction perpendicular to the generated force and that is rigid in the direction of said generated force.

22. A deformable mirror (1) according to claim 1, wherein all of the rigid link means (10) are fastened to the opposite face (4) of the membrane (2) via a layer of an adhesive (13) that is flexible in a direction perpendicular to said generated force, and that is rigid in the direction of said generated force, covering the opposite face (4) of the membrane (2).

23. A deformable mirror (1) according to claim 1, wherein the rigid link means (10) are fastened on the side opposite from the opposite face (4) of the membrane (2) via spots of rigid adhesive (12).

24. A deformable mirror (1) according to claim 1, wherein the elements of the force actuators (5, 6) that are incorporated into the support plate (7) are engaged in said support plate (7).

25. A deformable mirror (1) according to claim 1, wherein control of the elements of the force actuators (5, 6) that are suitable for controlling the intensity of the generated force is servo-controlled electrically.

* * * * *